(12) United States Patent
Katayama et al.

(10) Patent No.: US 9,174,520 B2
(45) Date of Patent: Nov. 3, 2015

(54) ELECTRIC VEHICLE

(71) Applicant: HONDA MOTOR CO., LTD., Tokyo (JP)

(72) Inventors: Goichi Katayama, Utsunomiya (JP); Daijiro Takizawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/439,135

(22) PCT Filed: Jul. 1, 2013

(86) PCT No.: PCT/JP2013/067975
§ 371 (c)(1),
(2) Date: Apr. 28, 2015

(87) PCT Pub. No.: WO2014/069046
PCT Pub. Date: May 8, 2014

(65) Prior Publication Data
US 2015/0246606 A1    Sep. 3, 2015

(30) Foreign Application Priority Data

Oct. 31, 2012   (JP) ................................. 2012-240976

(51) Int. Cl.
| | | |
|---|---|---|
| *B60R 16/04* | (2006.01) | |
| *B60K 1/04* | (2006.01) | |
| *B60K 1/00* | (2006.01) | |
| *B60L 15/00* | (2006.01) | |

(52) U.S. Cl.
CPC ... *B60K 1/04* (2013.01); *B60K 1/00* (2013.01); *B60L 15/007* (2013.01); *B60K 2001/0416* (2013.01)

(58) Field of Classification Search
CPC .... B60K 1/00; B60K 1/04; B60K 2001/0405; B60K 2001/0416; B60K 2001/0433; B60L 15/007; B60R 16/04; H01M 2/1083
See application file for complete search history.

(56) References Cited

U.S. PATENT DOCUMENTS

| | | | | |
|---|---|---|---|---|
| 5,392,873 A | * | 2/1995 | Masuyama et al. | 180/68.5 |
| 5,641,031 A | * | 6/1997 | Riemer et al. | 429/423 |
| 6,220,383 B1 | * | 4/2001 | Muraki et al. | 180/68.5 |
| 6,225,788 B1 | * | 5/2001 | Kouzu et al. | 320/150 |
| 6,344,728 B1 | * | 2/2002 | Kouzu et al. | 320/116 |

(Continued)

FOREIGN PATENT DOCUMENTS

| | | |
|---|---|---|
| JP | 07-081429 A | 3/1995 |
| JP | 08-002405 A | 1/1996 |

(Continued)

OTHER PUBLICATIONS

International Search Report dated Sep. 10, 2013, issued in corresponding application No. PCT/JP2013/067975.

*Primary Examiner* — Hau Phan
*Assistant Examiner* — Jacob Meyer
(74) *Attorney, Agent, or Firm* — Westerman, Hattori, Daniels & Adrian, LLP

(57) ABSTRACT

An electric vehicle wherein at least part of a cell unit is provided along an inclined part of a rear dividing wall. A bottom end of the cell unit is positioned lower than the hip point of a passenger. As seen from the vehicle-width direction, motor mounts are positioned so that the top part of the cell unit and part of the motor mounts overlap in the vertical direction of the electric vehicle.

6 Claims, 12 Drawing Sheets

(56) References Cited

U.S. PATENT DOCUMENTS

| | | | |
|---|---|---|---|
| 6,411,063 B1* | 6/2002 | Kouzu et al. | 320/150 |
| 6,988,575 B2* | 1/2006 | Takedomi et al. | 180/68.5 |
| 7,004,274 B2* | 2/2006 | Shibasawa et al. | 180/68.5 |
| 7,021,412 B2* | 4/2006 | Koike et al. | 180/68.5 |
| 7,025,160 B2* | 4/2006 | Awakawa | 180/68.5 |
| 7,484,581 B2* | 2/2009 | Yamafuji | 180/65.1 |
| 7,503,585 B2* | 3/2009 | Hashimura et al. | 280/782 |
| 7,654,351 B2* | 2/2010 | Koike et al. | 180/68.5 |
| 7,690,464 B2* | 4/2010 | Yustick et al. | 180/68.5 |
| 7,690,686 B2* | 4/2010 | Hashimura et al. | 280/782 |
| 7,886,861 B2* | 2/2011 | Nozaki et al. | 180/232 |
| 7,900,727 B2* | 3/2011 | Shinmura | 180/68.1 |
| 8,037,960 B2* | 10/2011 | Kiya | 180/68.5 |
| 8,051,934 B2* | 11/2011 | Kiya et al. | 180/68.5 |
| 8,430,194 B2* | 4/2013 | Yamatani | 180/68.1 |
| 8,453,778 B2* | 6/2013 | Bannier et al. | 180/68.5 |
| 8,505,662 B2* | 8/2013 | Schwarz et al. | 180/68.5 |
| 8,584,779 B2* | 11/2013 | Tsuchiya et al. | 180/68.5 |
| 8,708,079 B2* | 4/2014 | Hashimura et al. | 180/68.5 |
| 8,714,291 B2* | 5/2014 | Riach | 180/68.5 |
| 8,717,761 B2* | 5/2014 | Aoki et al. | 361/692 |
| 8,720,636 B2* | 5/2014 | Akoum et al. | 180/299 |
| 8,739,911 B2* | 6/2014 | Katou et al. | 180/68.5 |
| 8,763,741 B2* | 7/2014 | Harunari | 180/68.5 |
| 8,820,455 B2* | 9/2014 | Nitawaki et al. | 180/68.5 |
| 8,881,853 B2* | 11/2014 | Nitawaki | 180/68.5 |
| 8,919,865 B2* | 12/2014 | Ogawa et al. | 296/187.11 |
| 8,936,126 B2* | 1/2015 | Nitawaki et al. | 180/68.5 |
| 8,991,530 B2* | 3/2015 | Langer et al. | 180/65.1 |
| 9,048,484 B2* | 6/2015 | Hatta et al. | 1/1 |
| 2003/0067747 A1* | 4/2003 | Hasegawa et al. | 361/695 |
| 2003/0089540 A1* | 5/2003 | Koike et al. | 180/68.5 |
| 2003/0095382 A1* | 5/2003 | Takedomi et al. | 361/688 |
| 2003/0098191 A1* | 5/2003 | Takedomi et al. | 180/68.5 |
| 2003/0186115 A1* | 10/2003 | Shibasawa et al. | 429/100 |
| 2005/0205316 A1* | 9/2005 | Yamafuji | 180/68.5 |
| 2006/0096797 A1 | 5/2006 | Tsuchiya | |
| 2007/0089442 A1 | 4/2007 | Tsuchiya | |
| 2007/0238015 A1* | 10/2007 | Kubota et al. | 429/120 |
| 2008/0196957 A1* | 8/2008 | Koike et al. | 180/68.5 |
| 2009/0314557 A1* | 12/2009 | Takeuchi et al. | 180/65.1 |
| 2010/0101885 A1* | 4/2010 | Nozaki et al. | 180/232 |
| 2011/0132676 A1 | 6/2011 | Kodaira | |
| 2011/0139527 A1* | 6/2011 | Bannier et al. | 180/68.5 |
| 2011/0155488 A1* | 6/2011 | Riach | 180/65.1 |
| 2012/0031695 A1* | 2/2012 | Tsuchiya et al. | 180/68.5 |
| 2012/0118659 A1* | 5/2012 | Shinde et al. | 180/291 |
| 2012/0175177 A1* | 7/2012 | Lee et al. | 180/68.5 |
| 2012/0247856 A1* | 10/2012 | Shinde et al. | 180/68.5 |
| 2013/0168167 A1* | 7/2013 | Matsumoto | 180/65.31 |
| 2013/0277130 A1* | 10/2013 | Katou et al. | 180/68.5 |
| 2013/0319780 A1* | 12/2013 | Nitawaki | 180/68.5 |
| 2013/0327583 A1* | 12/2013 | Nitawaki et al. | 180/68.5 |
| 2014/0302362 A1* | 10/2014 | Takizawa | 429/83 |

FOREIGN PATENT DOCUMENTS

| | | |
|---|---|---|
| JP | 09-309343 A | 12/1997 |
| JP | 2009-061914 A | 3/2009 |
| JP | 2011-135666 A | 7/2011 |
| JP | 2012-081904 A | 4/2012 |
| WO | 2010/125602 A1 | 11/2010 |
| WO | 2011/010651 A1 | 1/2011 |

* cited by examiner

ELECTRIC VEHICLE

TECHNICAL FIELD

The present invention relates to an electric vehicle having a battery unit and a motor.

BACKGROUND ART

According to an electric vehicle disclosed in Japanese Laid-Open Patent Publication No. 09-309343 (hereinafter referred to as "JP 09-309343 A"), a battery cluster 20 is disposed below a driver seat 6 (FIG. 2).

A vehicle 1000 disclosed in U.S. Patent Application Publication No. 2006/0096797 (hereinafter referred to as "US 2006/0096797 A1") has a first battery pack 1900 that is a 12-volt lead storage battery, and a second battery pack 2000 that is a lithium ion battery ([0032], [0033]). The first battery pack 1900 is disposed in an engine compartment ([0033]). The second battery pack 2000 is provided beneath the base of a front passenger seat 1120 of the vehicle 1000 ([0034]).

According to an electric vehicle disclosed in Japanese Laid-Open Patent Publication No. 08-002405 (hereinafter referred to as "JP 08-002405 A"), a lead battery 25 is disposed above a fuel tank 24, and a sodium-sulfur battery 28 is disposed behind a partition 27 (FIG. 4, FIG. 5, [0011], [0012]).

According to U.S. Patent Application Publication No. 2007/0089442 (hereinafter referred to as "US 2007/0089442 A1"), a rear air-conditioning unit 2000 and a battery pack 3000 are provided on a floor panel 4000 and below an upper back panel 5000 (FIG. 1, [0052]). The battery pack 3000 is substantially in the shape of a rectangular parallelepiped (FIGS. 1 and 2).

According to a vehicle 1 disclosed in U. S. Patent Application Publication No. 2011/0132676 (hereinafter referred to as "US 2011/0132676 A1"), the front side of a battery 12 that supplies electric power to a motor 11 is disposed forwardly of a dash panel 18, and the rear side of the battery 12 is disposed in a tunnel 22 that extends in a longitudinal direction of the vehicle (Abstract, FIGS. 1 and 2).

SUMMARY OF INVENTION

The above documents propose various layouts with respect to battery units such as batteries, etc. However, there is still room for improvement in the proposed layouts. For example, according to JP 09-309343 A, since the battery cluster 20 is disposed below (immediately below) the driver seat 6 (FIG. 2), a limitation is imposed on efforts to lower the position of the driver seat 6 itself. Therefore, it is difficult to lower the center of gravity of the overall vehicle while the vehicle is being driven, thus leading to roll-axis moments or the like that impede efforts to enhance driving performance.

According to the vehicle 1000 disclosed in US 2006/0096797 A1, the second battery pack 2000 is provided beneath the base of the front passenger seat 1120 of the vehicle 1000 (FIG. 2, FIG. 3, [0034]). Consequently, the vehicle 1000 has the same limitations or restrictions as the vehicle disclosed in JP 09-309343 A.

According to JP 08-002405 A, the lead battery 25 and the sodium-sulfur battery 28 are disposed in the positions shown in FIGS. 4 and 5 of the reference. For example, the lead battery 25 and the sodium-sulfur battery 28 are located in relatively higher positions compared to the seated position of the passenger. Therefore, it is difficult to lower the center of gravity of the overall vehicle while the vehicle is being driven, leading to roll-axis moments or the like that impede efforts to enhance driving performance.

According to US 2007/0089442 A1, the battery pack 3000, which is in the shape of a rectangular parallelepiped, is disposed on the floor panel 4000 and below the upper back panel 5000 and the rear air-conditioning unit 2000 (FIG. 1). In particular, FIG. 1 of US 2007/0089442 A1 shows that the front part (left side of FIG. 1) of the upper back panel 5000 is inclined along a rear seat back 1010, whereas the battery pack 3000 is disposed in an uninclined position. Therefore, a dead space is created on a front side (left side in FIG. 1) of the battery pack 3000 between the battery pack 3000 and the upper back panel 5000.

According to US 2011/0132676 A1, the front side of the battery 12 is disposed forwardly of the dash panel 18, and the rear side of the battery 12 is disposed in a tunnel 22 that extends in the longitudinal direction of the vehicle (see Abstract, and FIGS. 1 and 2). Consequently, there is a tendency for the battery 12 to impair occupant comfort in the vehicle, or to present obstacles to efforts to make the vehicle compact.

The present invention has been made in view of the aforementioned problems. An object of the present invention is to provide an electric vehicle, which enables at least one of driving performance, compactness, and occupant comfort to be improved.

According to the present invention, there is provided an electric vehicle having two seats, including a battery unit, a motor configured to drive a rear wheel, and motor mounts disposed behind the battery unit and supporting the motor securely in place. The electric vehicle further comprises a rear partition defining a passenger compartment behind a rear surface of an occupant seat, wherein the rear partition includes a slanted portion, which is inclined progressively rearward of the electric vehicle in an upward direction, the battery unit has at least a portion disposed along the slanted portion of the rear partition, the battery unit has a lower end disposed below a hip point of an occupant, and the motor mounts are disposed such that an upper portion of the battery unit and a portion of the motor mounts overlap each other in a vertical direction of the electric vehicle as viewed transversely across the electric vehicle.

According to the present invention, the lower end of the battery unit is disposed below the hip point, thereby making the center of gravity of the electric vehicle lower, as compared with a situation in which the lower end of the battery box is disposed above the hip point. Consequently, it is possible for the center of gravity of the electric vehicle to be positioned close to the hip point in the vertical direction. Thus, the occupant of the vehicle is given a feeling of oneness with the electric vehicle and a nimble sense of maneuverability when driving the electric vehicle. Further, assuming that the hip point can be lowered, the height of the electric vehicle can also be lowered, resulting in a reduction in air resistance and thereby minimizing fuel consumption or electric power consumption.

According to the present invention, in addition, the rear partition includes the slanted portion, which is inclined progressively rearward of the electric vehicle in an upward direction, and at least a portion of the battery unit is disposed along the slanted portion of the rear partition. Consequently, it is possible to locate the battery unit close to an occupant seat in the longitudinal direction of the electric vehicle. In addition, the motor mounts are disposed such that an upper portion of the battery unit and a portion of the motor mounts overlap each other in a vertical direction of the electric vehicle as viewed transversely across the electric vehicle (e.g., the upper portion of the battery unit and the portion of the motor mounts overlap each other as viewed in plan). Thus, the motor mounts and the motor fixed to the motor mounts can be located close to the occupant seat in the longitudinal direction of the electric vehicle. Stated otherwise, the amount of dead space behind the rear partition can be reduced. Consequently, the electric vehicle can be made compact, or the space in the passenger compartment can be increased by the reduced dead space, thereby enhancing occupant comfort.

The battery unit may be disposed outside of the passenger compartment, and the battery unit may have a portion fixed to the rear partition. In this manner, it is possible to increase the rigidity of the rear partition (as well as the vehicle body) by taking advantage of the rigidity of the battery unit itself.

The battery unit may supply electric power to the motor. In addition, the battery unit, the motor, and an inverter configured to control supply of electric power from the battery unit to the motor may be disposed in one space. Normally, the motor, the battery unit, and the inverter are high-voltage devices, respectively. By disposing such high-voltage devices close to each other, electric power efficiency can be increased.

The inverter may be disposed behind the battery unit and above the motor. When disposed in this manner, the motor, the battery unit, and the inverter are housed in a compact fashion.

The battery unit may be constructed integrally with the inverter. In accordance with this feature, it is possible to dispense with electric power cables that interconnect the battery unit and the inverter.

The battery unit may include a cover, and the cover may be installed in a direction that is the same as a direction in which the inverter is installed. In accordance with this feature, the process of installing the inverter and operations to connect electric wires thereto can be facilitated.

DESCRIPTION OF EMBODIMENTS

A. Embodiment

1. Description of Overall Arrangement

[1-1. Overall Arrangement]

Figure 1:
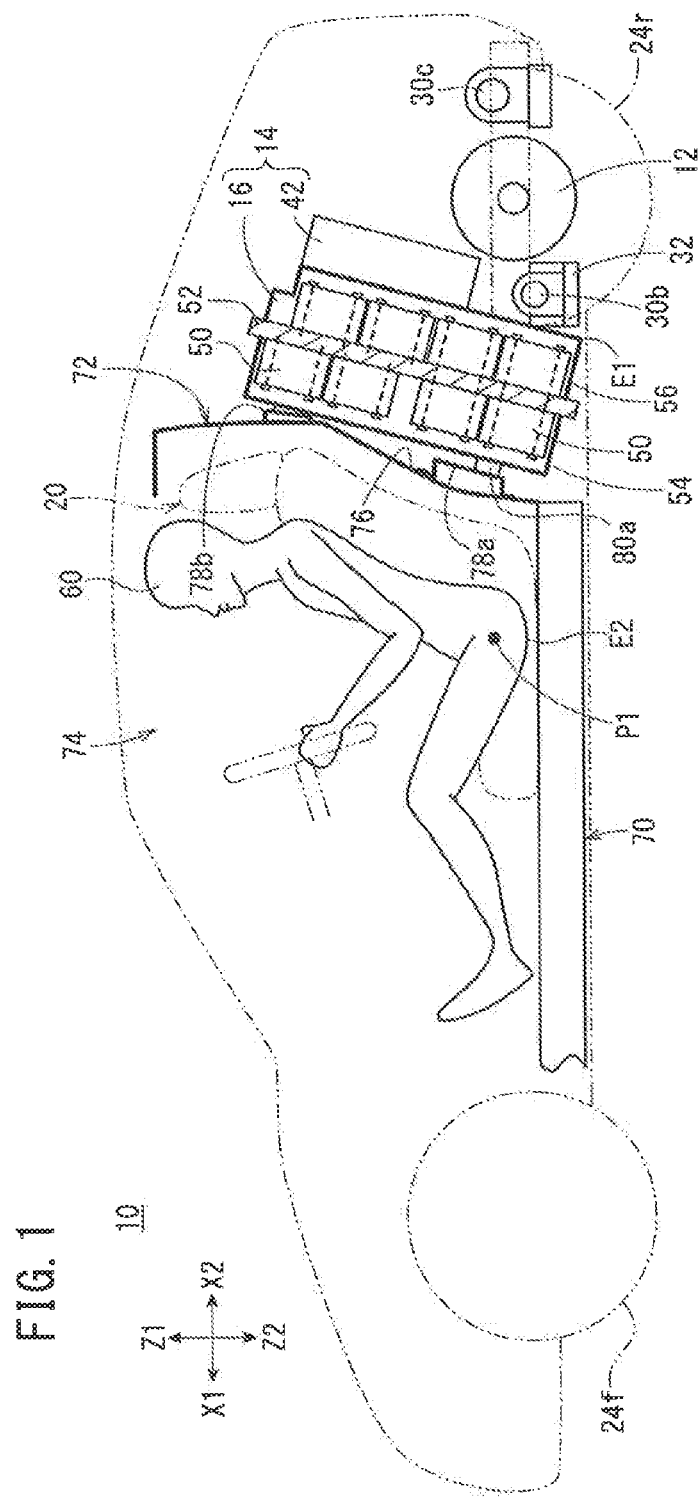
FIG. 1 is a side elevational view, partially omitted from illustration, of an electric vehicle according to an embodiment of the present invention.
Figure 2:
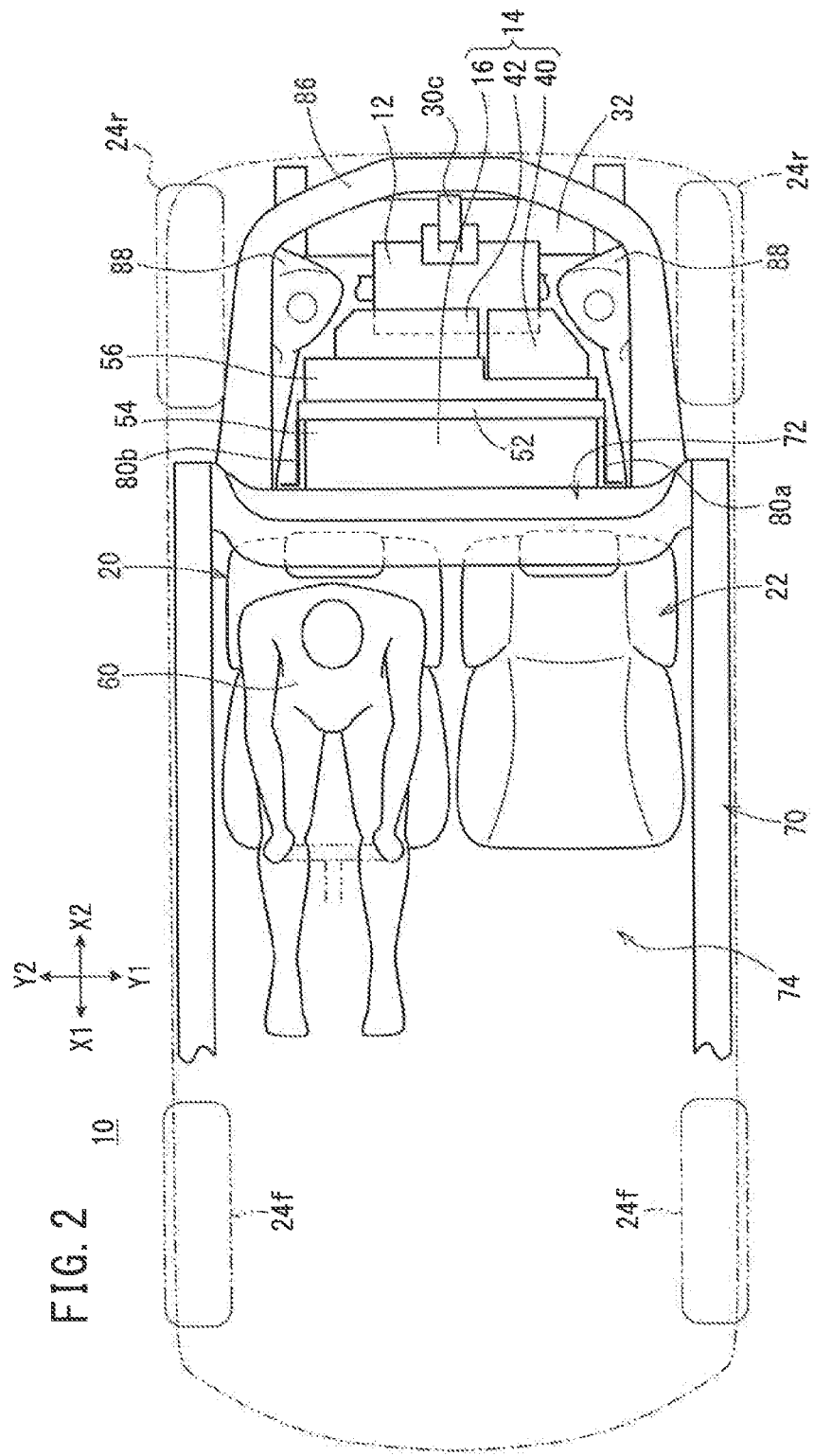
FIG. 2 is a plan view, partially omitted from illustration, of the electric vehicle.
Figure 3:
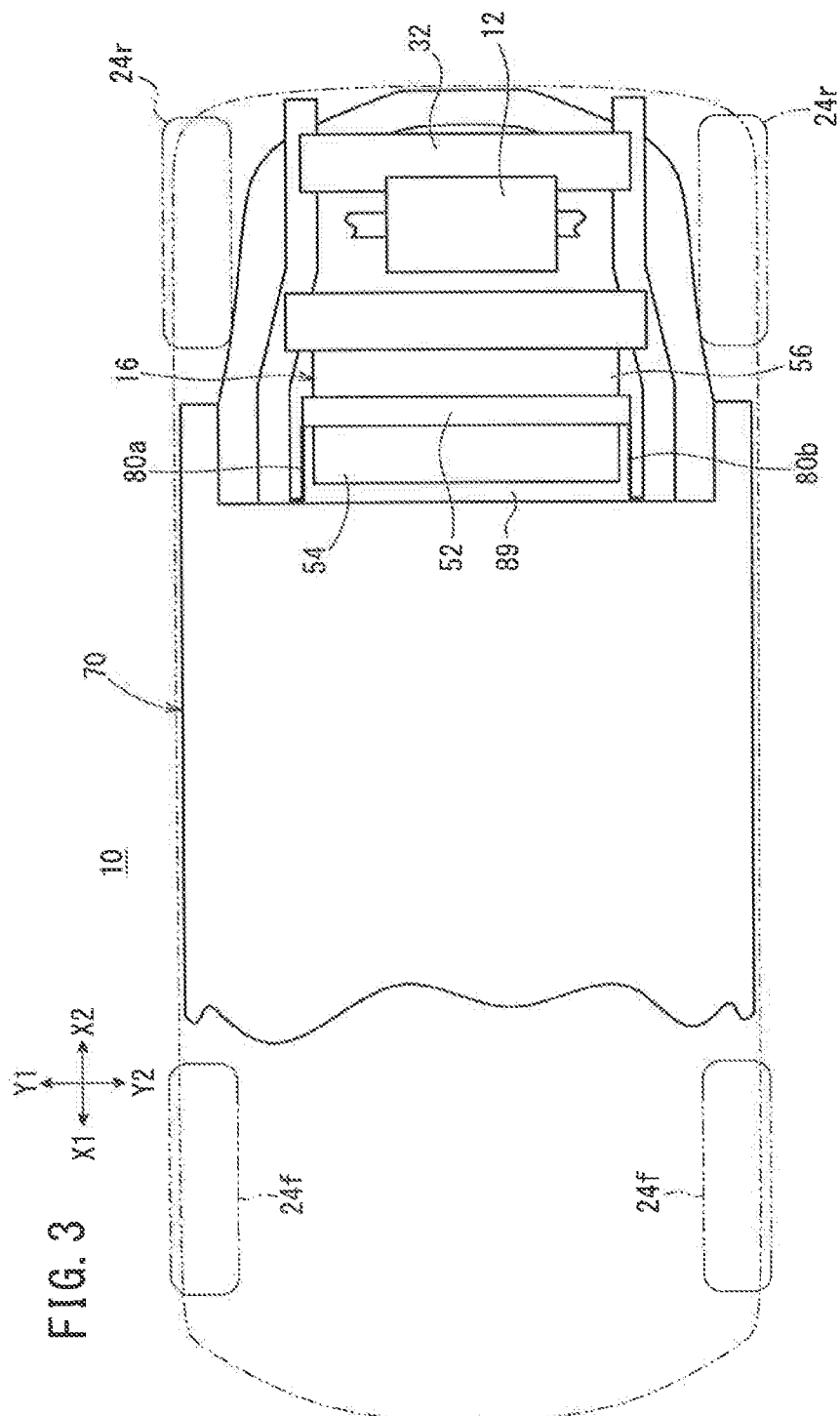
FIG. 3 is a bottom view, partially omitted from illustration, of the electric vehicle.
Figure 4:
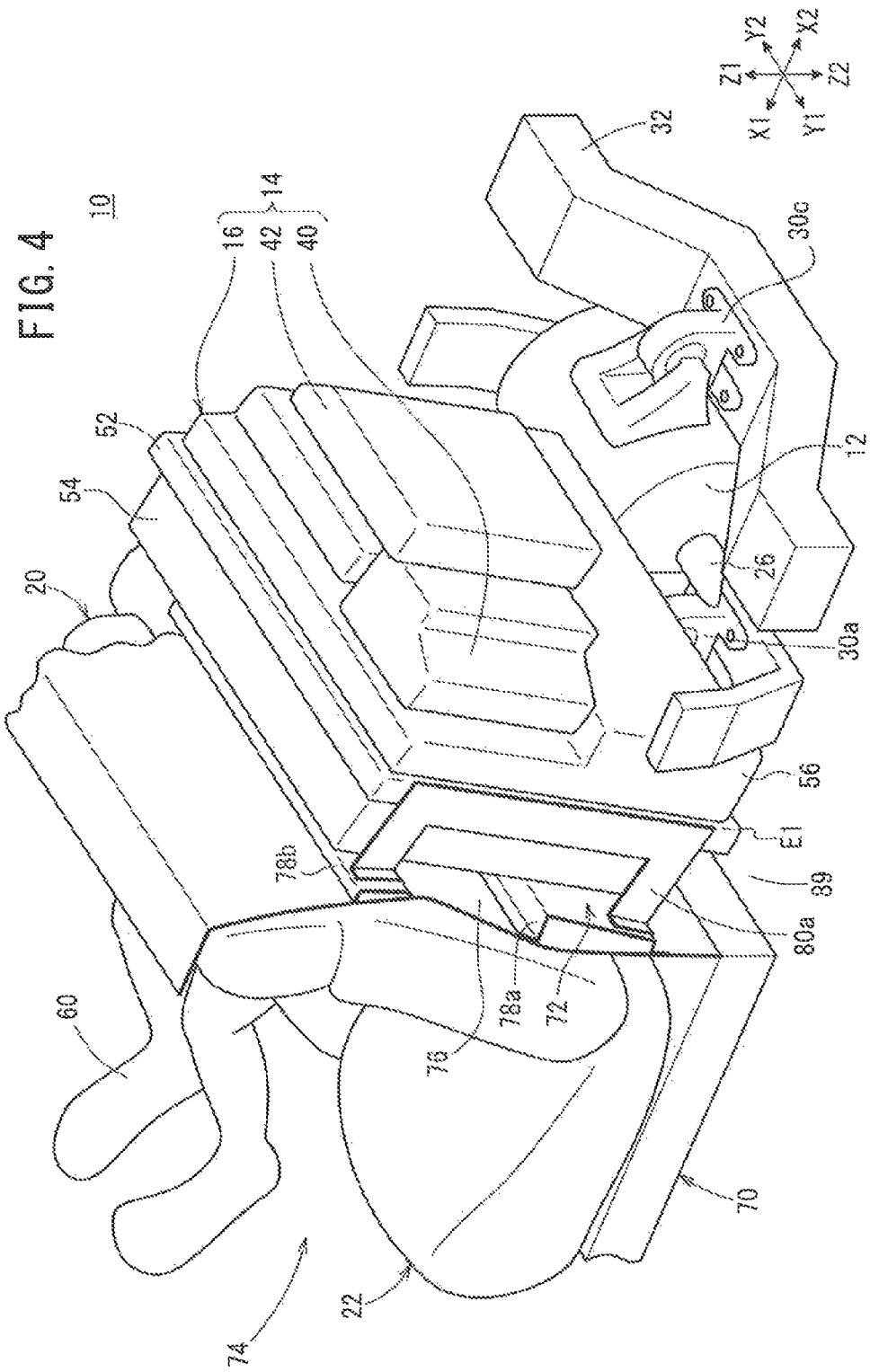
FIG. 4 is an enlarged fragmentary perspective view, partially omitted from illustration, of the electric vehicle.
Figure 5:
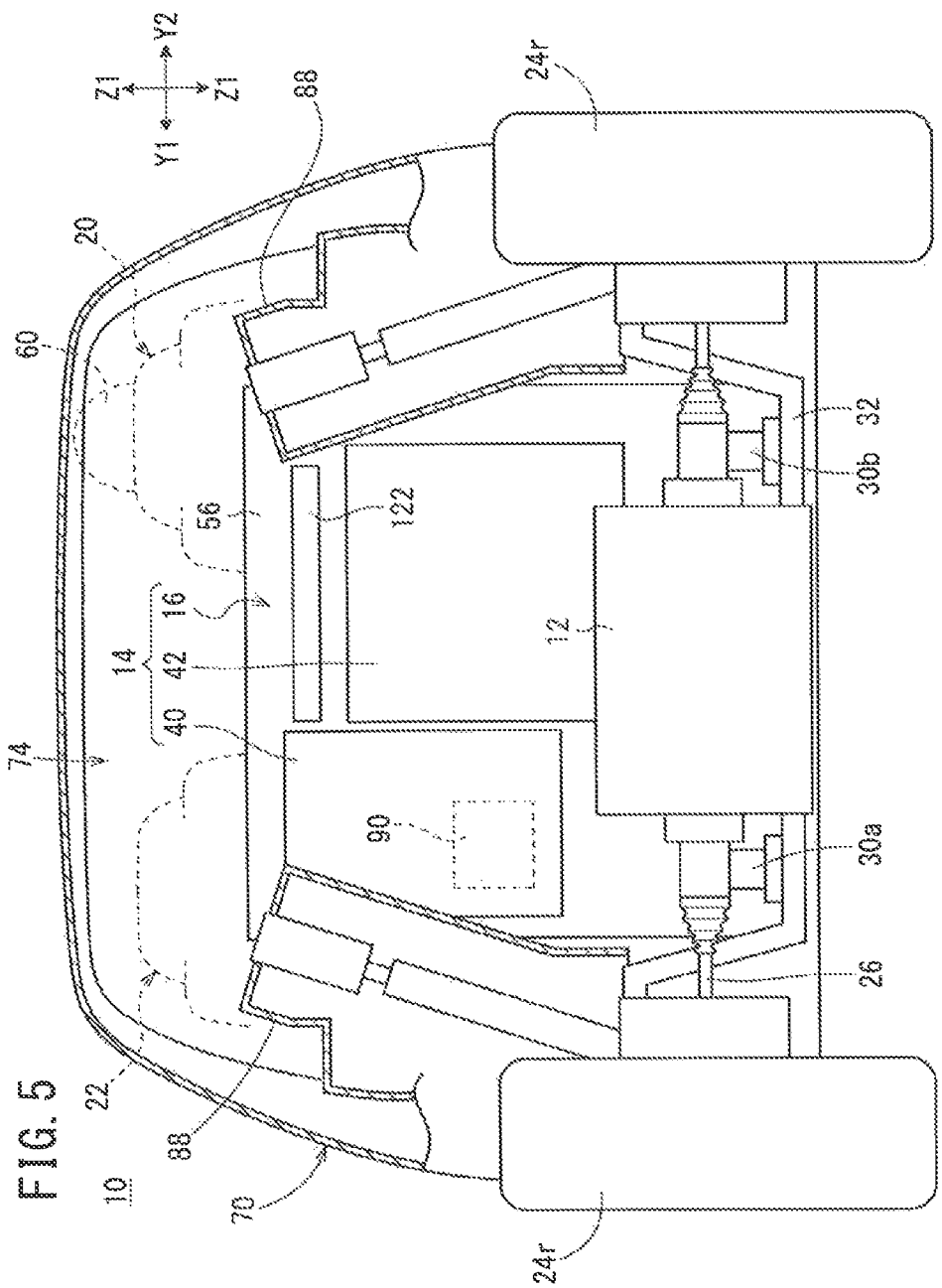
FIG. 5 is a rear elevational view, partially omitted from illustration, of the electric vehicle.

FIG. 1 is a side elevational view, partially omitted from illustration, of an electric vehicle 10 (hereinafter also referred to as a "vehicle 10") according to an embodiment of the present invention. FIG. 2 is a plan view, partially omitted from illustration, of the electric vehicle 10. FIG. 3 is a bottom view, partially omitted from illustration, of the electric vehicle 10. FIG. 4 is an enlarged fragmentary perspective view, partially omitted from illustration, of the electric vehicle 10. FIG. 5 is a rear elevational view, partially omitted from illustration, of the electric vehicle 10. The vehicle 10, which is an electric car (battery car) in a narrow sense, includes a motor 12 and an electric power system 14 having a battery box 16 (battery unit). As described later, the vehicle 10 may be another type of electric vehicle apart from an electric car, insofar as the motor 12 is included therein.

The vehicle 10 is a two-seater vehicle in which a driver seat 20 and a front passenger seat 22, each functioning as an occupant seat, are disposed adjacent to each other in a transverse direction of the vehicle, i.e., in the direction of arrows Y1 and Y2 in FIG. 2, etc. As described later, aside from a two-seater vehicle, the vehicle 10 may be another type of vehicle (as to the number of seats thereof). Although the vehicle 10 is a right-hand drive vehicle, the vehicle 10 may be a left-hand drive vehicle.

[1-2. Motor 12]

(1-2-1. Overview of Motor 12)

The motor 12 serves as a drive source for generating a driving force F for the vehicle 10, and in the present embodiment, the motor 12 drives the rear wheels 24r. The motor 12, which comprises a three-phase AC brushless motor, generates a driving force F for the vehicle 10 on the basis of electric power supplied from the battery box 16. In addition, the motor 12 regenerates electric power (regenerative electric power Preg) [W] in a regenerative mode, and outputs the regenerative electric power Preg to the battery box 16 in order to charge the battery box 16. The motor 12 may also output the regenerative electric power Preg to a 12-volt system or to various accessories, not shown. The motor 12 is combined integrally with a gearbox and is disposed coaxially with shafts 26 for the rear wheels 24r.

(1-2-2. Layout of Motor 12)

Figure 6:
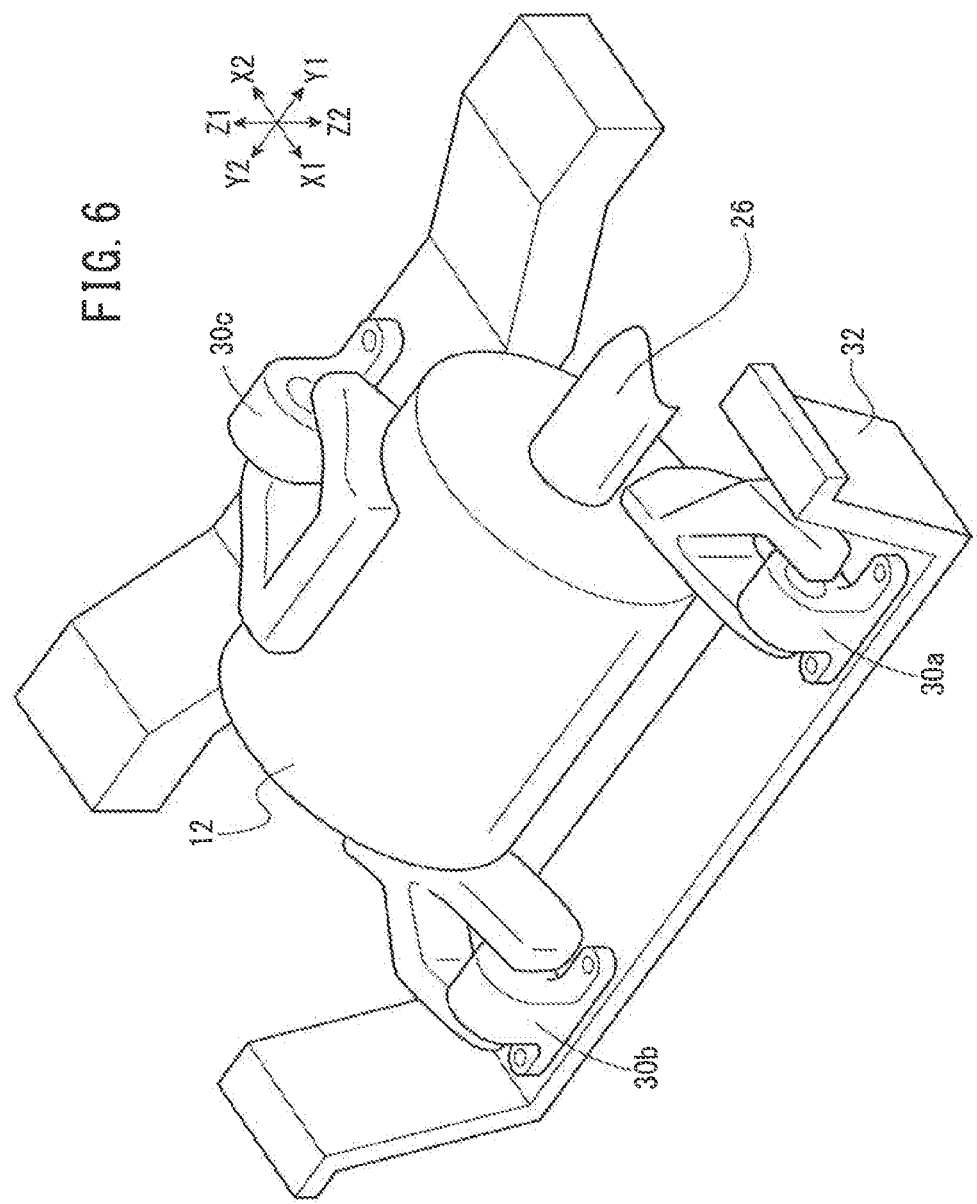
FIG. 6 is a perspective view of a motor and portions around the periphery thereof.
Figure 7:
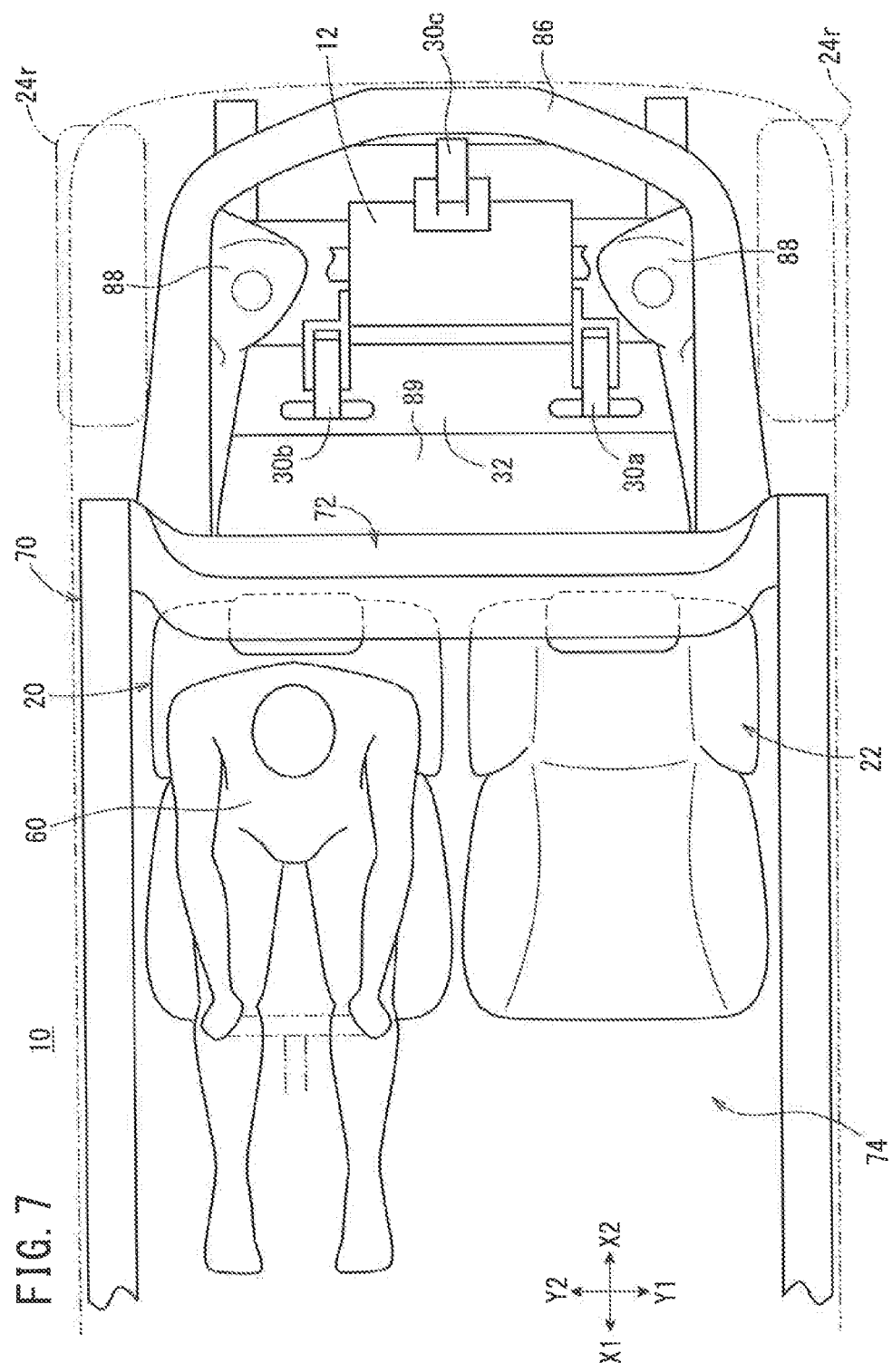
FIG. 7 is an enlarged fragmentary plan view, partially omitted from illustration (including a battery box), of the electric vehicle.

FIG. 6 is a perspective view of the motor 12 and portions around the periphery thereof. FIG. 7 is an enlarged fragmentary plan view, partially omitted from illustration (including the battery box 16), of the electric vehicle 10. As shown in FIGS. 1 through 7, the motor 12 is fixed to a subframe 32 by motor mounts 30a through 30c (hereinafter referred to collectively as "motor mounts 30").

The motor mounts 30a through 30c according to the present embodiment include three motor mounts, i.e., a left front mount 30a, a right front mount 30b, and a rear mount 30c. However, the motor mounts 30a through 30c are not limited to this description, insofar as the motor mounts 30a through 30c are capable of supporting the motor 12. As shown in FIGS. 1, 2, and 6, etc., the left front mount 30a and the right front mount 30b as well as a portion of the battery box 16 overlap each other as viewed in plan, i.e., along the direction of arrows Z1 and Z2.

[1-3. Electric Power System 14]
(1-3-1. Overview of Electric Power System 14)

The electric power system 14 supplies electric power the motor 12 and is charged with regenerative electric power Preg from the motor 12. In addition to the battery box 16, the electric power system 14 includes a motor controller 40 and a battery controller 42.

(1-3-1-1. Battery Box 16)
(1-3-1-1-1. Overview of Battery Box 16)

Figure 8:
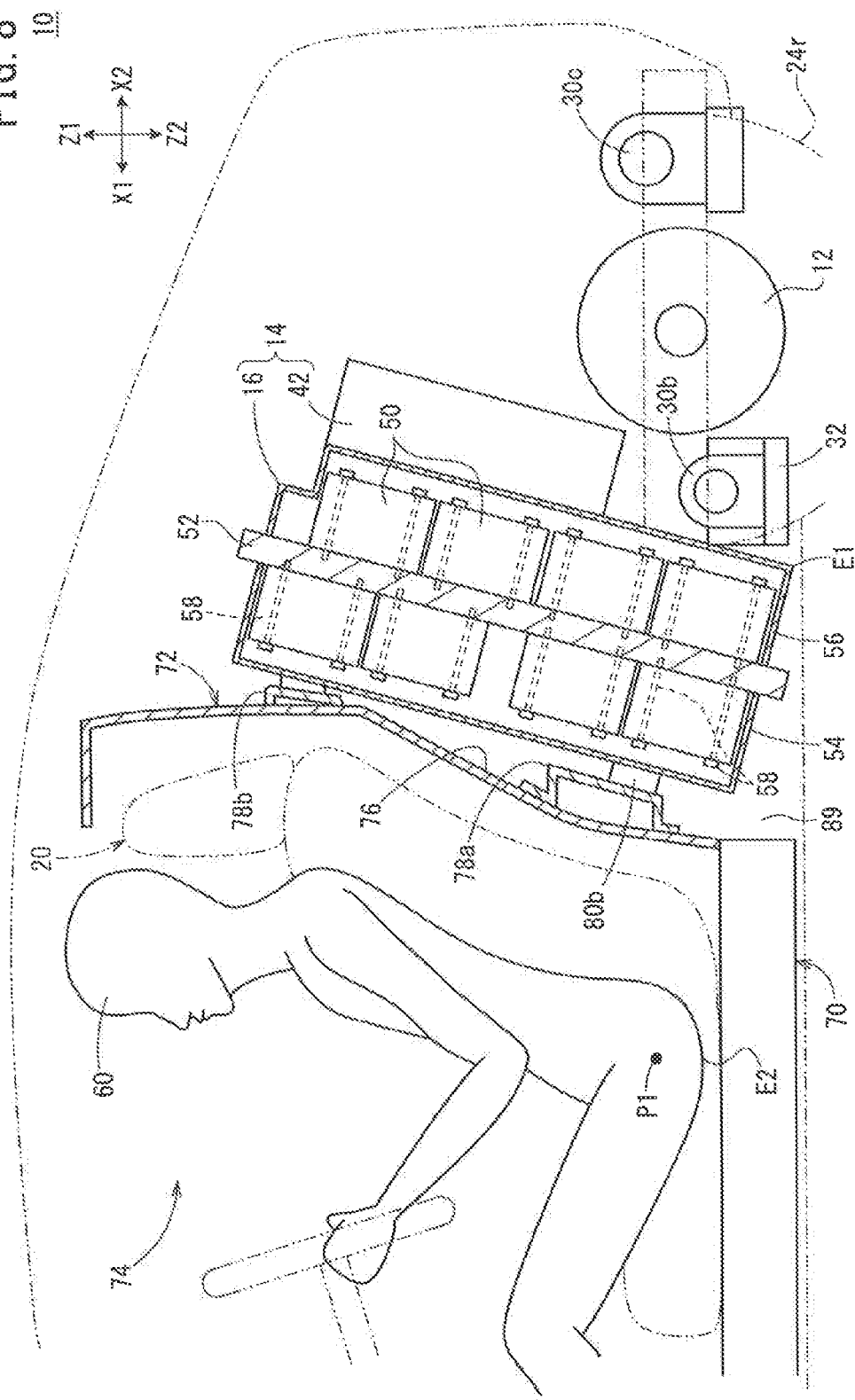
FIG. 8 is an enlarged fragmentary side elevational view, partially omitted from illustration, of the electric vehicle.

FIG. 8 is an enlarged fragmentary side elevational view, partially omitted from illustration, of the electric vehicle 10. The battery box 16 includes a plurality of battery modules 50, a battery tray 52, a first battery cover 54, and a second battery cover 56. Although the battery box 16 basically is in the shape of a rectangular parallelepiped, as shown in FIG. 4, etc., the battery box 16 has a recess in which the motor controller 40 is disposed. The battery box 16 is disposed in the same space as the motor 12 and the motor controller 40 (including an inverter 90, to be described later). The battery box 16 is constructed integrally with the motor controller 40 (see FIG. 4, etc.).

(1-3-1-1-2. Battery Modules 50)

Each of the battery modules 50, which serve as battery units, is an electric energy storage device (energy storage) including a plurality of battery cells, which may comprise lithium ion secondary cells, nickel hydrogen secondary cells, or capacitors. According to the present embodiment, each of the battery modules 50 comprises lithium ion secondary cells. Further, in the present embodiment, each of the battery modules 50 is substantially in the shape of a rectangular parallelepiped. A non-illustrated DC/DC converter may be connected between the battery modules 50 and the motor controller 40 (inverter 90) for stepping up or stepping down the output voltage of the battery modules 50 or the output voltage of the motor 12.

(1-3-1-1-3. Battery Tray 52)

The battery tray 52 is a plate-like support member made of metal or plastic that supports the battery modules 50. As shown in FIG. 8, each of the battery modules 50 is fixed to the battery tray 52 by bolts 58.

(1-3-1-1-4. First Battery Cover 54, Second Battery Cover 56)

The first battery cover 54 and the second battery cover 56 are members made of plastic or metal that cover the battery modules 50 and the battery tray 52. The first battery cover 54 is fixed to the battery tray 52 on a front side of the battery tray 52 and is oriented in the X2 direction, and the second battery cover 56 is fixed to the battery tray 52 on a rear side of the battery tray 52 and is oriented in the X1 direction. The first battery cover 54 and the second battery cover 56 are fixed to the battery tray 52 by non-illustrated bolts.

(1-3-1-1-5. Layout of Battery Box 16)

Figure 9:
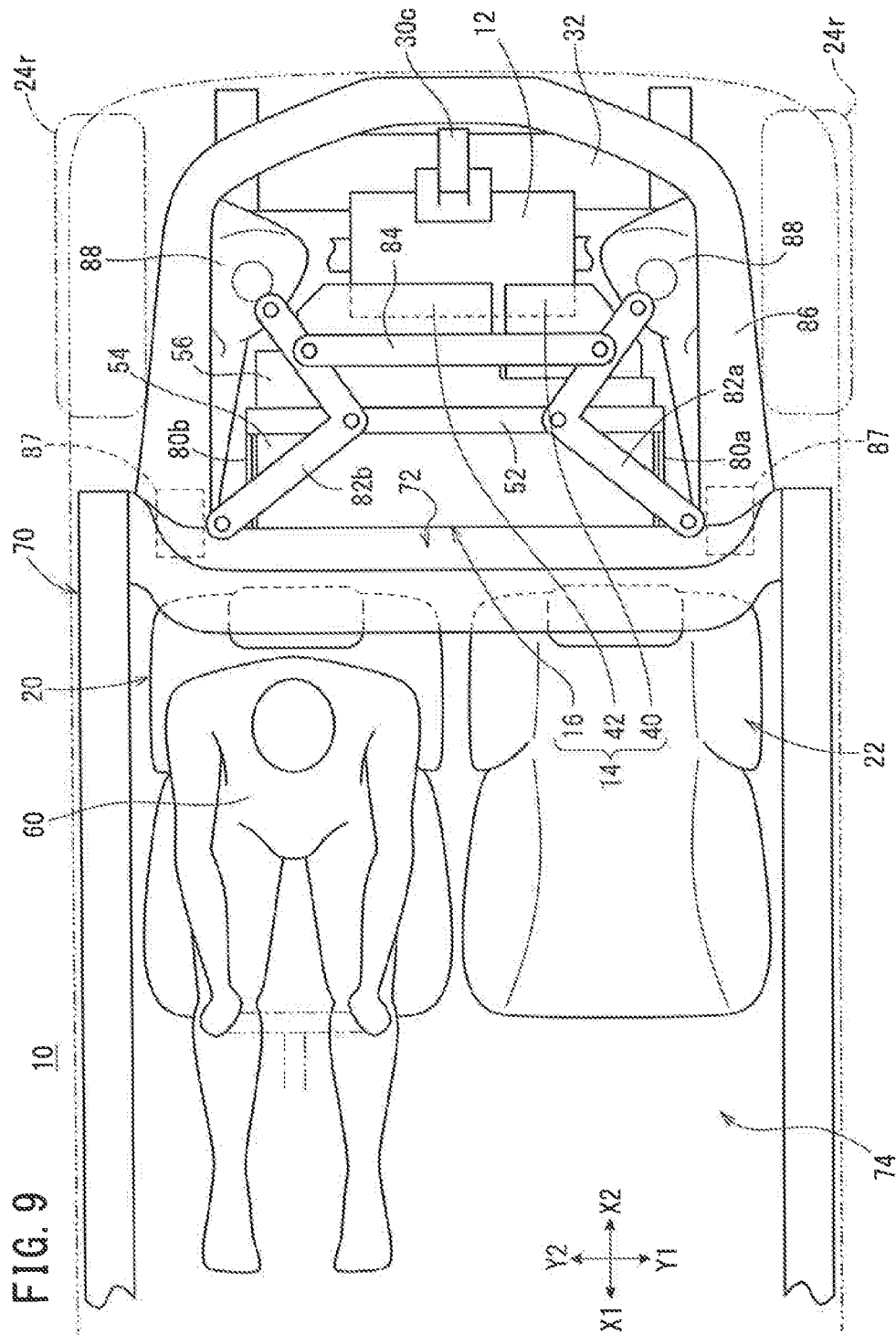
FIG. 9 is an enlarged fragmentary plan view illustrating a supporting structure for the battery box.

FIG. 9 is an enlarged fragmentary plan view illustrating a supporting structure for the battery box 16. As shown in FIG. 1, etc., the battery box 16 has a lower end E1, which is disposed in a position below a hip point P1 of a driver 60 as an occupant. The hip point P1 is represented by a center (design value) of the hip of an occupant (including the driver 60).

According to the present embodiment, the lower end E1 of the battery box 16 is disposed in a position, which lies below not only the hip point P1, but also a lower end E2 (design value) of the hip of the driver 60.

As shown in FIGS. 1 and 4, etc., the battery box 16 is inclined along a rear partition 72 of a metallic main frame 70 of the vehicle 10, such that an upper portion of the battery box 16 is positioned more rearwardly (rightwardly in FIG. 1) than a lower portion of the battery box 16.

The rear partition 72 is a partition (a so-called bulkhead) that defines a passenger compartment 74, and is disposed at a position behind rearward sides of the driver seat 20 and the front passenger seat 22. As shown in FIGS. 1 and 4, etc., the rear partition 72 includes a slanted portion 76, which is inclined progressively rearward in an upward direction.

As shown in FIG. 4, etc., the battery box 16 is fixed to the rear partition 72 and along the slanted portion 76 by a left side bracket 80a and a right side bracket 80b. Thus, the battery box 16 is disposed on an outer side of the passenger compartment 74.

The battery box 16 is fixed to areas of the rear partition 72, which comprise stiffened members 78a, 78b that are increased in rigidity due to having a substantially rectangular cross-sectional shape. The lower stiffened member 78a is disposed on the slanted portion 76, whereas the upper stiffened member 78b is not disposed on the slanted portion 76. The upper stiffened member 78b may also be disposed on the slanted portion 76.

The phrase "along the slanted portion 76" does not necessarily imply that the front surface of the battery box 16 lies parallel to the slanted portion 76, but rather, implies that the front surface of the battery box 16 is of a shape more likely to protrude forwardly toward a lower part of the slanted portion 76 than if the front surface of the battery box 16 were to extend in a strictly vertical direction.

As shown in FIG. 9, the battery box 16 is fixed in position by a left upper bracket 82a, a right upper bracket 82b, and a stiffener bracket 84. More specifically, as shown in FIG. 9, the left upper bracket 82a and the right upper bracket 82b, which are of a bent shape, have respective ends that are fixed to front portions (around central pillars 87) of an upper back panel 86, respective other ends that are fixed to suspension damper housings 88, and respective centers that are fixed to the battery tray 52.

As shown in FIG. 9, the stiffener bracket 84 is of a straight shape, one end of which is fixed to the left upper bracket 82a, and another end of which is fixed to the right upper bracket 82b. The stiffener bracket 84 increases the stiffness of a linkage that is provided between the suspension damper housings 88, thereby preventing the battery box 16 from wobbling.

The battery box 16 can be installed from below the main frame 70. To permit the battery box 16 to be installed in this manner, the main frame 70 has an opening 89 defined in a bottom surface thereof for allowing the battery box 16 pass therethrough. A lower cover, not shown, is disposed below the battery box 16 in order to protect the battery box 16, etc., from mud and water splashing up from the road.

The left upper bracket 82a, the right upper bracket 82b, and the stiffener bracket 84 are illustrated only in FIG. 9, and have been omitted from illustration in the other figures.

(1-3-1-2. Motor Controller 40)
(1-3-1-2-1. Overview of Motor Controller 40)

The motor controller 40 serves to control electric power that is exchanged between the motor 12 and the battery box 16, and includes an inverter 90 (see FIG. 5) and a non-illustrated electronic control unit. An electric power cable (a so-called three-phase cable) is connected between the motor 12 and the motor controller 40.

(1-3-1-2-2. Layout of Motor Controller 40)

As shown in FIGS. 2 and 4, etc., the motor controller 40 (inverter 90) is fixed to a left side of the second battery cover 56 behind the second battery cover 56. The motor controller 40 (inverter 90) is combined integrally with the battery box 16 (see FIG. 4, etc.). The motor controller 40 is fixed to the second battery cover 56 by non-illustrated bolts or the like, for example. As shown in FIG. 4, etc., the motor controller 40 (inverter 90) is disposed in the same space as the motor 12 and the battery box 16.

(1-3-1-3. Battery Controller 42)

(1-3-1-3-1. Overview of Battery Controller 42)

The battery controller 42 serves to control electric power that is exchanged between the battery box 16 and a non-illustrated external power supply. The battery controller 42 includes a charger and an electronic control unit, neither of which are shown.

(1-3-1-3-2. Layout of Battery Controller 42)

As shown in FIGS. 2 and 4, etc., the battery controller 42 is fixed to a right side of the second battery cover 56 behind the second battery cover 56. The battery controller 42 is constructed integrally with the battery box 16, and is disposed adjacent to the motor controller 40 (see FIG. 4, etc.). The battery controller 42 fixed to the second battery cover 56 by non-illustrated bolts or the like, for example. As shown in FIG. 4, etc., the battery controller 42 is disposed in the same space as the motor 12, the battery box 16, and the motor controller 40 (inverter 90).

2. Advantages of the Present Embodiment

In the foregoing manner, according to the present embodiment, as described above, the lower end E1 of the battery box 16 (battery unit or cell cluster) is disposed below the hip point P1, thereby making the center of gravity of the vehicle 10 lower compared with the lower end E1 of the battery box 16, which is disposed above the hip point P1. Consequently, it is possible to position the center of gravity of the vehicle 10 close to the hip point P1. Hence, the occupant of the vehicle 10 is given a feeling of oneness with the vehicle 10 and a nimble sense of maneuverability when driving the vehicle 10. Further, assuming that the hip point P1 can be lowered, the height of the vehicle 10 can also be lowered, resulting in a reduction in air resistance and thereby minimizing electric power consumption.

According to the present embodiment, in addition, the rear partition 72 includes the slanted portion 76, which is inclined progressively rearward in an upward direction, and the battery box 16 is disposed along the slanted portion 76. Therefore, it is possible to locate the battery box 16 close to the driver seat 20 and the front passenger seat 22 (occupant seats) in the longitudinal direction of the vehicle 10. In addition, the motor mounts 30a, 30b are disposed such that an upper portion of the battery box 16 and the motor mounts 30a, 30b overlap each other in the vertical direction of the vehicle 10 as viewed transversely across the vehicle 10 (more specifically, the upper portion of the battery box 16 and a portion of the motor mounts 30a, 30b overlap each other as viewed in plan). Therefore, it is possible to position the motor mounts 30a, 30b as well as the motor 12 that is supported thereon close to the driver seat 20 and the front passenger seat 22 (occupant seat) along the longitudinal direction of the vehicle 10. Stated otherwise, the amount of dead space behind the rear partition 72 can be reduced. Consequently, the vehicle 10 can be made compact, or the space in the passenger compartment 74 can be increased by the reduced dead space, thereby enhancing occupant comfort.

According to the present embodiment, the battery box 16 is disposed outside of the passenger compartment 74, and includes a portion that is fixed to the rear partition 72 (see FIGS. 4, 9, etc.). In this manner, it is possible to increase the rigidity of the rear partition 72 (as well as the vehicle body) by taking advantage of the rigidity of the battery box 16 itself.

According to the present embodiment, the battery box 16 supplies electric power to the motor 12, and the motor 12, the battery box 16, and the inverter 90 are disposed in the same space (see FIG. 4, etc.). Normally, the motor 12, the battery box 16, and the inverter 90 are high-voltage devices, respectively. By disposing such high-voltage devices close to each other, electric power efficiency can be increased.

According to the present embodiment, the inverter 90 disposed behind the battery box 16 and above the motor 12 (see FIGS. 2, 4, etc.). When disposed in this manner, the motor 12, the battery box 16, and the inverter 90 are housed in a compact fashion.

According to the present embodiment, the battery box 16 is constructed integrally with the motor controller 40 (inverter 90) (see FIG. 4, etc.). In accordance with this feature, it is possible to dispense with electric power cables that interconnect the battery box 16 and the inverter 90.

According to the present embodiment, the second battery cover 56 is installed in a direction that is the same as the direction in which the motor controller 40 (inverter 90) is installed (see FIG. 4, etc.). In accordance with this feature, the process of installing the inverter 90 and operations to connect electric wires (not shown) thereto can be facilitated.

B. Modifications

The present invention is not limited to the above embodiment, but may employ various arrangements on the basis of the disclosure of the present description. For example, the following arrangements may be employed in the present invention.

1. Electric Vehicle 10 (Object to which the Present Invention is Applied)

In the above embodiment, the vehicle 10 is a two-seater type of vehicle. However, the vehicle 10 may be of any type (as to the number of seats), insofar as attention focused on the positional relationship between the motor 12 (motor mounts 30a through 30c) and the battery box 16, or the positional relationship between the rear partition 72 and the battery box 16. For example, the vehicle 10 may be a one-seater, a three-seater, or a four-seater type of vehicle or the like. Stated otherwise, the number of seats on the vehicle 10 may be one or three or more.

In the above embodiment, the battery box 16 (battery unit) is mounted on the electric vehicle 10, which is a battery car in a narrow sense. However, from the standpoint of the layout of the motor 12 and the battery box 16, the present invention is applicable to other uses. For example, the present invention may be applied to other types of electric vehicles 10 (e.g., a hybrid vehicle having a non-illustrated engine as a drive source in addition to the motor 12, or a fuel cell vehicle).

2. Motor 12

In the above embodiment, the motor 12 comprises a three-phase AC brushless motor. However, the motor 12 is not limited to such a motor. Although the motor 12 is a brushless motor in the above-described embodiment, the motor 12 may be a brush motor.

In the above embodiment, the motor 12 is used to drive the rear wheels 24r. However, the motor 12 may be used to drive front wheels 24f, insofar as the battery box 16 (battery unit) can be inclined and the motor mounts 30a through 30c can be placed in a space below the inclined battery box 16. From the same standpoint, the motor 12 need not necessarily be a motor that is used to drive wheels, but may be a motor for use in any of other devices (e.g., an air compressor or an air conditioner that is mounted in the vehicle 10). Alternatively, the motor 12 may be a motor that is used in various apparatus such as industrial machines (e.g., manufacturing apparatus, machine tools, or elevators), home electric appliances (e.g., washing machines, cleaners, air conditioners, or refrigerators), or the like.

3. Motor Mounts 30

In the above embodiment, the motor 12 is supported on three motor mounts 30a through 30c. However, insofar as the motor 12 can be supported, the number of motor mounts 30 is not limited to three.

In the above embodiment, the front motor mounts 30a, 30b and an upper portion of the battery box 16 overlap each other as viewed in plan (see FIGS. 1, 2, 7, etc.). However, from the standpoint of effectively utilizing the space below the slanted portion 76 of the rear partition 72 and around the lower portion of the battery box 16, the front motor mounts 30a, 30b and the upper portion of the battery box 16 need not necessarily be superposed, insofar as the motor mounts 30a, 30b can be disposed such that the upper portion of the battery box 16 (battery unit) and the motor mounts 30a, 30b overlap each other in the vertical direction (the direction of arrows Z1 and Z2) of the vehicle 10, as viewed transversely (in the direction of arrows Y1 and Y2) across the vehicle 10. Stated otherwise, the front motor mounts 30a, 30b may be positioned laterally of the battery box 16 (along a transverse direction across the vehicle 10) as viewed in plan.

4. Electric Power System 14

[4-1. Battery Box 16 (Battery Unit, Cell Cluster)]

In the above embodiment, the battery box 16 is used as a battery unit or a cell cluster. However, other battery units may be used insofar as the battery units function as an electric power supply source. For example, a fuel cell stack may be used as a battery unit. If a fuel cell stack used, the fuel cell stack may be inclined in the same manner as with the battery box 16.

In the above embodiment, the lower end E1 of the battery box 16 is disposed below the hip point P1 and the lower end E2 of the hip of the driver 60. However, insofar as the lower end E1 of the battery box 16 is disposed below the hip point P1, the lower end E1 of the battery box 16 may be disposed above the lower end E2 of the hip.

Figure 10:
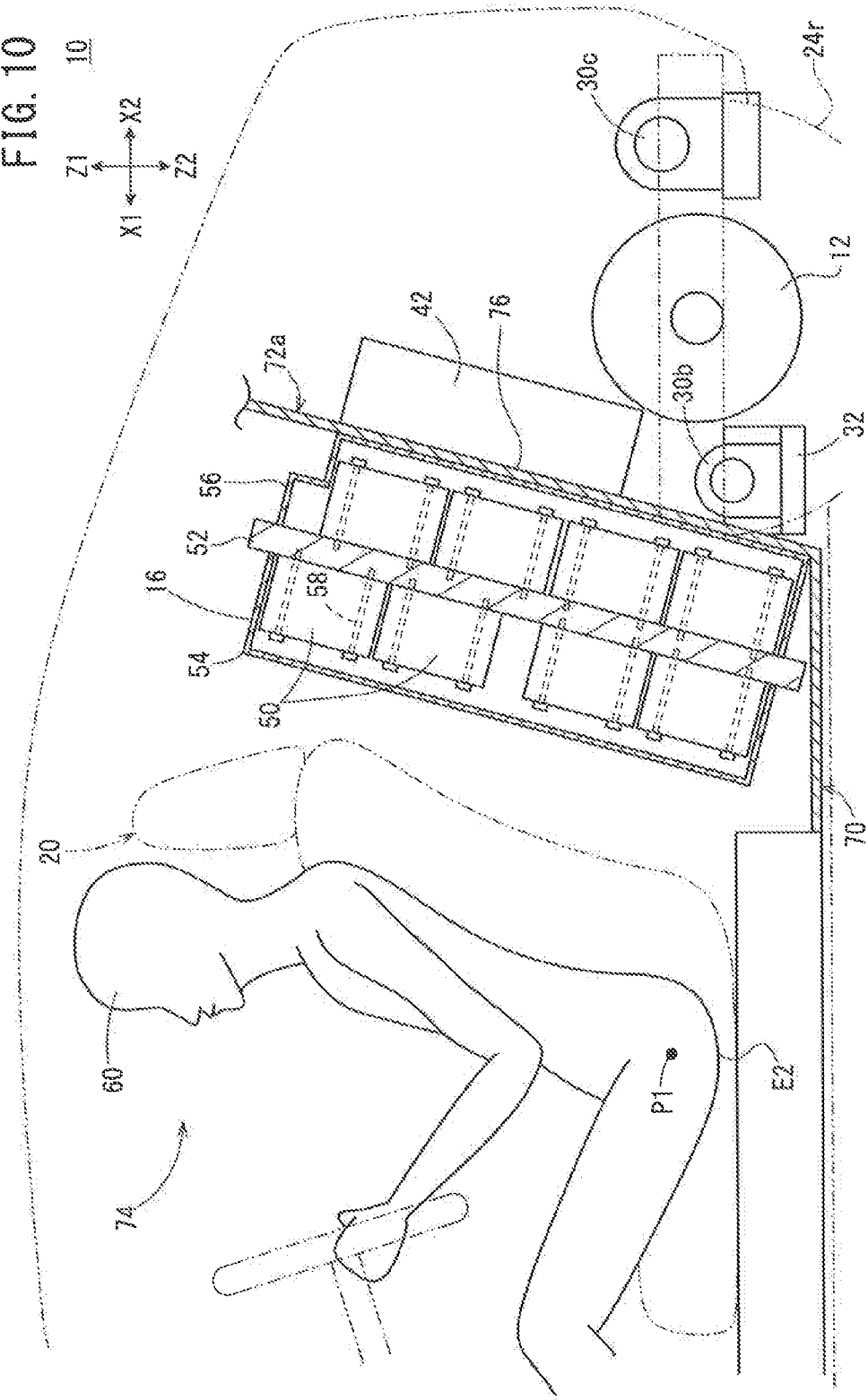
FIG. 10 is an enlarged fragmentary side elevational view showing a modified rear partition.

In the above embodiment, the battery box 16 is disposed outwardly of the rear partition 72 (see FIGS. 1, 4, etc.). However, insofar as the battery box 16 (battery unit or cell cluster) is disposed along the slanted portion 76 of the rear partition 72, the battery box 16 may be disposed inwardly of a rear partition 72a, as shown in FIG. 10.

In the above embodiment, the battery box 16 includes the battery modules 50, which are disposed on both sides (front and rear sides, in terms of the orientation of the vehicle 10) of a principal plane of the battery tray 52 (see FIG. 8, etc.). However, the battery modules 50 are not limited to such a layout, insofar as the battery box 16 or the battery modules 50 can be disposed along the slanted portion 76 of the rear partition 72.

Figure 11:
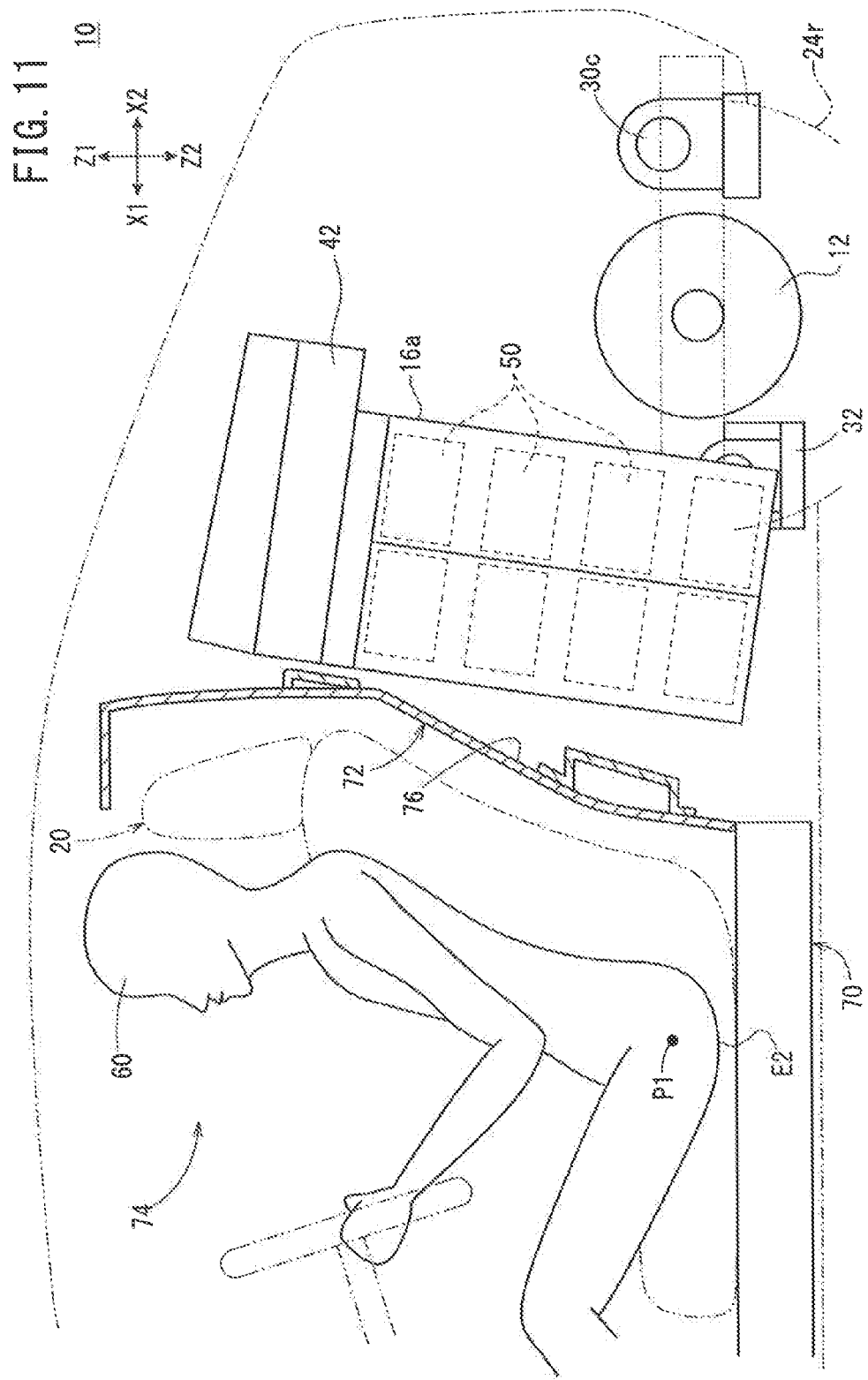
FIG. 11 is an enlarged fragmentary side elevational view showing a first modification of the battery box according to the embodiment.

FIG. 11 is an enlarged fragmentary side elevational view showing a battery box 16a according to a first modification of the battery box 16 (battery unit or cell cluster) of the above-described embodiment. The battery box 16a comprises a plurality of battery modules 50, which are inclined and stacked in a plurality of layers. The battery box 16a is disposed along the rear partition 72, thereby making it possible to reduce the amount of dead space behind the rear partition 72.

In the above embodiment and the modification shown in FIG. 11, the battery box 16, which is basically in the shape of a rectangular parallelepiped, is inclined (see FIG. 1, etc.). However, the battery box 16 is not limited such an inclined layout, insofar as the battery unit can be disposed along the slanted portion 76 of the rear partition 72. For example, the battery modules 50 may be stacked in a plurality of layers, with the front ends of the battery modules shifted more rearwardly in higher layers.

Figure 12:
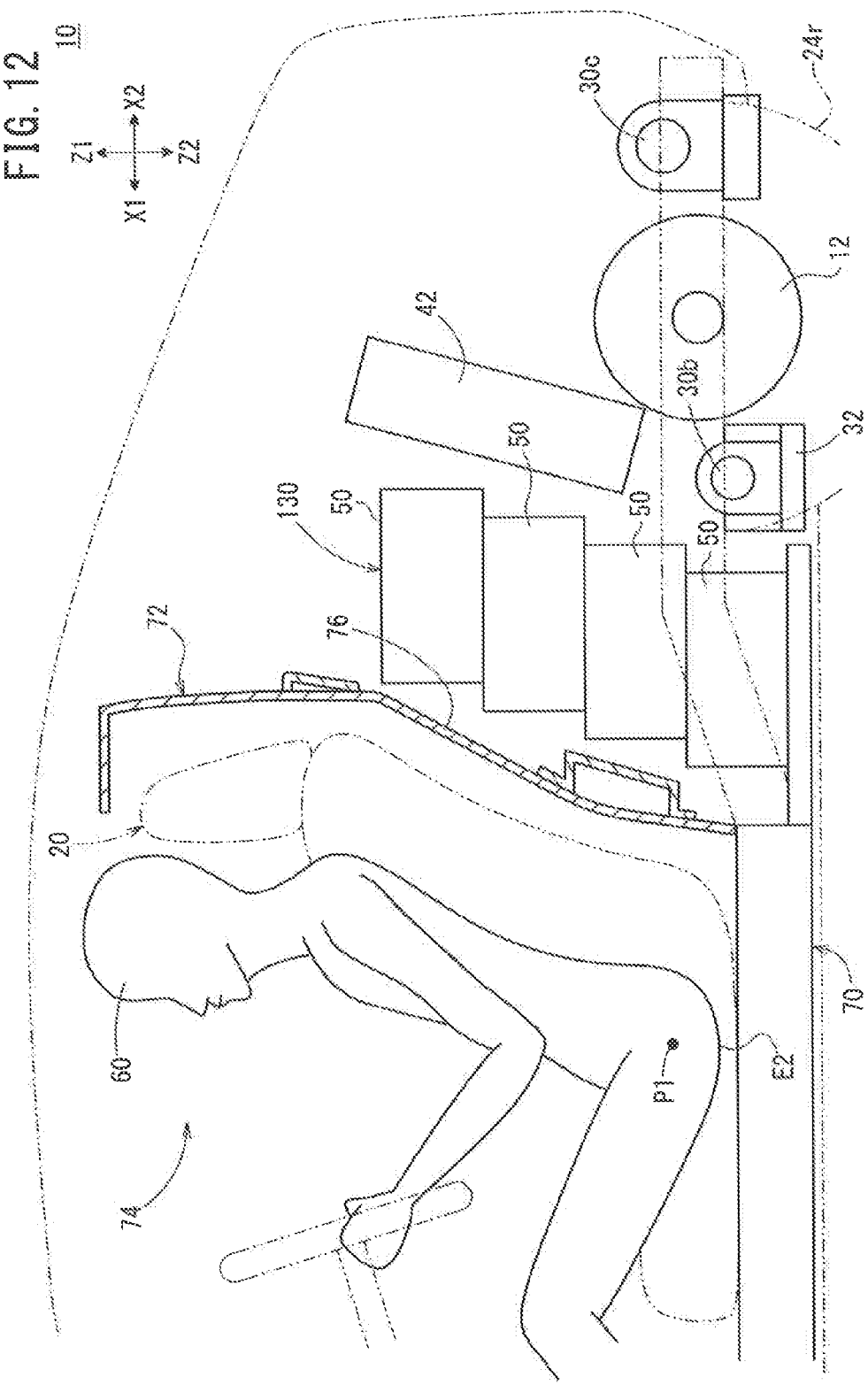
FIG. 12 is an enlarged fragmentary side elevational view showing a second modification of the battery box according to the embodiment.

FIG. 12 is an enlarged fragmentary side elevational view showing a battery cluster 130 according to a second modification of the battery box 16 (battery unit or cell cluster) of the above-described embodiment. The battery cluster 130 comprises a plurality of battery modules 50 disposed in a stepped pattern. The battery cluster 130 is disposed along the rear partition 72, thereby making it possible to reduce the amount of dead space behind the rear partition 72.

In FIG. 12, each of the battery modules 50 is shifted in a stepped pattern. However, only a portion of the battery modules 50 may be shifted in this manner. For example, two lower battery modules 50 in FIG. 12 may be kept in the same position along the longitudinal direction (the direction of arrows X1 and X2).

In the above embodiment, the battery box 16 is supported at upper and side regions thereof. More specifically, the battery box 16 is supported by the left side bracket 80a, the right side bracket 80b, the left upper bracket 82a, the right upper bracket 82b, and the stiffener bracket 84 (see FIGS. 4, 9, etc.). However, insofar as the battery box 16 can be supported in place, the present invention is not limited to such a supporting structure. For example, the battery box 16 may be supported only at an upper region or on side regions thereof. Alternatively, in addition to or in place of the regions referred to above, the battery box 16 may be supported at other regions (e.g., a lower region) thereof.

In the above embodiment, the battery box 16 supplies electric power to the motor 12. However, insofar as attention is focused on the positional relationship between the motor 12 (motor mounts 30a, 30b) and the battery box 16, in addition to the motor 12, the battery box 16 may be used to supply electric power to other components apart from the motor 12. Alternatively, the battery box 16 may be configured so as not to supply electric power to the motor 12, but only to supply electric power to other components apart from the motor 12.

[4-2. Motor Controller 40 and Battery Controller 42]

In the above embodiment, the motor controller 40 including the inverter 90 and the battery controller 42 are disposed on an outer side of the second battery cover 56. However, concerning the layout of the battery box 16, the motor controller 40 and the battery controller 42 are not limited to the above layout. For example, as shown in FIG. 11, the battery controller 42 (and the motor controller 40) may be disposed above the battery box 16a.

In the above embodiment, the inverter 90 is disposed behind the battery box 16 and above the motor 12 (see FIGS. 2, 4, etc.). However, insofar as attention is focused on the positional relationship between the motor 12 (motor mounts 30a, 30b) and the battery box 16, the inverter 90 need not necessarily be disposed in the aforementioned layout. For example, the inverter 90 may be disposed above the battery box 16a.

In the above embodiment, the motor controller 40 (inverter 90) is constructed integrally with the battery box 16 (battery unit), without any cables being interposed between the motor controller 40 and the battery box 16. However, insofar as attention is focused on the positional relationship between the motor 12 (motor mounts 30a, 30b) and the battery box 16, cables may be provided if desired. Similarly, in the above embodiment, the battery controller 42 is constructed integrally with the battery box 16 (battery unit), without any cables being interposed between the battery controller 42 and the battery box 16. However, cables may be provided if desired.

In the above embodiment, the motor 12, the battery box 16 (battery unit), the motor controller 40 (inverter 90), and the battery controller 42 are disposed in the same space (see FIG. 4, etc.). However, such a layout is not necessarily required, insofar as attention is focused on the positional relationship between the motor 12 (motor mounts 30*a*, 30*b*) and the battery box 16. For example, the motor controller 40 (inverter 90) and the battery controller 42 may be disposed in a space that differs from the space in which the motor 12 and the battery box 16 (battery unit) are installed.

In the above embodiment, the second battery cover 56 installed in a direction that is the same as the direction in which the motor controller 40 (inverter 90) and the battery controller 42 are installed. However, such an arrangement is not necessarily required, insofar as attention is focused on the positional relationship between the motor 12 (motor mounts 30*a*, 30*b*) and the battery box 16.

5. Other Features

In the above embodiment, the battery box 16 is disposed along the slanted portion 76 of the rear partition 72, and the motor mounts 30*a*, 30*b* are disposed in the space behind the battery box 16. In addition, the motor 12 for driving the rear wheels 24*r* is supported on the motor mounts 30*a* through 30*c*. However, insofar as the battery box 16 (battery unit) is inclined, and any one of the motor mounts 30*a* through 30*c* is disposed in a space beneath the battery box 16, the same layout may be employed on the front side of the vehicle 10.

In the above embodiment, the rear partition 72 serves as part of the main frame 70. However, the rear partition 72 may be provided separately from the main frame 70, insofar as the rear partition 72 can function as a partition that defines the passenger compartment 74.

The invention claimed is:

1. An electric vehicle having two seats, including a battery unit, a motor configured to drive a rear wheel, and motor mounts disposed behind the battery unit and supporting the motor securely in place, the electric vehicle further comprising:

a rear partition defining a passenger compartment behind a rear surface of an occupant seat, wherein:

the rear partition includes a slanted portion, which is inclined progressively rearward of the electric vehicle in an upward direction;

the battery unit has at least a portion disposed along the slanted portion of the rear partition;

the battery unit has a lower end disposed below a hip point of an occupant; and the motor mounts are disposed such that an upper portion of the battery unit and a portion of the motor mounts overlap each other in a vertical direction of the electric vehicle as viewed transversely across the electric vehicle;

the upper portion of the battery unit is positioned more rearwardly than a lower portion of the battery unit in a longitudinal direction of the electric vehicle;

in space that is created below the upper portion of the battery unit and behind the lower portion of the battery unit, a portion of the motor mounts is disposed; and the portion of the motor mounts is located below the hip point.

2. The electric vehicle according to claim 1, wherein:

the battery unit is disposed outside of the passenger compartment; and the battery unit has a portion fixed to the rear partition.

3. The electric vehicle according to claim 1, wherein:

the battery unit supplies electric power to the motor; and the battery unit, the motor, and an inverter configured to control supply of electric power from the battery unit to the motor are disposed in one space.

4. The electric vehicle according to claim 3, wherein the inverter disposed behind the battery unit and above the motor.

5. The electric vehicle according to claim 3, wherein the battery unit is constructed integrally with the inverter.

6. The electric vehicle according to claim 5, wherein the battery unit includes a cover, the cover being installed in a direction that is the same as a direction in which the inverter is installed.

* * * * *